United States Patent [19]

Wilson et al.

[11] 4,196,101

[45] Apr. 1, 1980

[54] PROCESS FOR FORMING ALUMINA PELLETS CONTAINING TITANIA AND PROCESS FOR PRODUCING HYDRODESULFURIZATION CATALYST CONTAINING THE PELLETS

[75] Inventors: Geoffrey R. Wilson, Westlake Village; Masami Kayamoto, Whittier, both of Calif.

[73] Assignee: Filtrol Corporation, Los Angeles, Calif.

[21] Appl. No.: 874,753

[22] Filed: Feb. 3, 1978

Related U.S. Application Data

[63] Continuation-in-part of Ser. No. 671,333, Mar. 29, 1976, abandoned.

[51] Int. Cl.$^2$ .................. B01J 21/04; B01J 21/06; B01J 23/16; B01J 23/74; B01J 27/04

[52] U.S. Cl. .................. 252/439; 252/463; 252/465; 252/466 J; 252/466 PT; 208/216 R

[58] Field of Search ............ 252/463, 465, 439, 466 J, 252/466 PT; 208/216 R, 216 PP

[56] References Cited

U.S. PATENT DOCUMENTS

| | | |
|---|---|---|
| 3,184,415 | 5/1965 | Huntley et al. ............... 252/463 |
| 3,464,930 | 9/1969 | Friedrichsen et al. ........ 252/461 X |
| 3,544,617 | 12/1970 | Oga et al. ..................... 252/461 X |
| 3,945,946 | 3/1976 | Hindin et al. .................. 252/465 |
| 3,997,431 | 12/1976 | Beuther et al. ................ 208/216 |
| 4,039,478 | 8/1977 | Cull et al. ..................... 252/463 X |

Primary Examiner—W. J. Shine
Attorney, Agent, or Firm—Philip Subkow; Bernard Kriegel

[57] ABSTRACT

Shaped alumina pellets containing titania, catalysts employing the same, and process for producing the same.

10 Claims, No Drawings

PROCESS FOR FORMING ALUMINA PELLETS CONTAINING TITANIA AND PROCESS FOR PRODUCING HYDRODESULFURIZATION CATALYST CONTAINING THE PELLETS

This application is a continuation-in-part of application Ser. No. 671,333, F. Mar. 29, 1976, and now abandoned.

STATEMENT OF THE INVENTION

This invention relates to improvements in titanium-bearing pelleted catalysts. Applicants have found that the process employing solutions of titanium compounds requires special precautions in order to produce pellets of useful resistance to abrasion. These include use of solutions of organometallic compounds and controlled additions of acidic solutions of metallic salts.

We have now found that we may obtain an active hydrodesulfurization catalyst of superior resistance to abrasion by incorporating the Group IV-B metal compound particularly titanium oxide or in the form of a compound which may be converted into titanium oxide (titania). For the latter purpose, the preferred procedure according to the invention of this application, includes the incorporation of a non-acidic compound of titanium into pseudoboehmite prior to forming the shaped substrate. The formed pellet may then be calcined. The non acidic compound may be anatase or hydrated titanium oxide or a compound which may be converted into the titania hydrate prior to calcination. The calcined pellet contains alumina-titania and may then be used to produce the hydrodesulfurization catalyst or any other catalyst employing the pellet as a substrate. The weight ratio of the titania, expressed as $TiO_2$ on a volatile free basis, to the alumina on a volatile free basis is that which will give the concentration of the titania suitable for the catalyst.

The shaped and calcined alumina pellet containing the Group IV B metal compound may contain the Group IV B metal compound in the amount of 1% to about 40%, preferably about 1% to about 25% on a volatile-free basis, i.e., with the titanium expressed as $TiO_2$ and based on the total weight of the compound expressed as the oxide of the Group IV B metal compound and the alumina expressed as $Al_2O_3$.

The pellet may be formed by extrusion into pellets as through a die of circular or non-circular shape such as a polyfoil cross-section. It may be formed as pills or spheres or other shapes from a moist mixture of the alumina and titanium compound.

The moisture content of the extrusion mix for extrusion into a cylindrical or non-cylindrical pellet through a die to form pellets of maximum diameter of from about 1/50 to ⅛ of an inch and length of about 1/15" to ¼" ranges from about 50% to about 70% based on all of the components, to wit, the hydrated alumina and the hydrated Group IV B metal oxide and including moisture of the extrusion mix.

The pellet for use as a catalyst substrate may be formed by calcination of the above pellets at temperatures of about 900° F. to about 1500° F. for ½ hour or more. It may then be used as a substrate for incorporation of catalytic metal compounds.

The nature of the hydrated titania ($TiO_2 \times H_2O$) is well known in the art. The water content may range from a relatively dry $TiO_2$ to a water slurry. Typically it may range from about 20% to about 75%. The hydrated titania may be formed by hydrolysis of a titanium salt aided, if necessary, by reaction with a base and added to the hydrated alumina. For the purpose of this invention, we prefer to form the hydrated titanium oxide in situ by converting the titanium compound preferably maintaining the reaction mixture under conditions which are insufficiently acid to attack the alumina.

The titanium compound may be an inorganic titanium salt such as titanium tetrachloride ($TiCl_4$) which is combined with a base preferably under neutral or alkaline pH.

The titanium compound may be an organic titanium compound such as is described in U.S. Pat. No. 4,018,714, which is incorporated herein by this reference. Such hydrolyzeable compounds may be and preferably are those alkyl or aryl titanates $Ti(OR)_4$ and the chelates referred to in said patent which may be hydrolyzed in the extrusion mix. The hydrolysis may be accelerated by raising the pH of the mixture by addition of a base such as ammonium hydroxide and in the case of the chelates by heating.

Where we use the organo-titanium compounds to generate the titania by hydrolysis in the procedure referred to above, we prefer to use the readily hydrolyzable tetraisopropyl titanate $Ti(OC_3H_7)_4$ tetra butyl Ti-$(OC_4H_9)_4$ or tetra hexyl titanate, tetra kis (2-ethyl hexyl) titanate. Tetra hexyl titanate and the chelates may be hydrolyzed in alkaline conditions. In such case, the mixture may be mixed with a base such as ammonium hydroxide to raise the pH to cause hydrolysis of the titanate or the chelate. Where heat is used, the temperature is raised by application of heat preferably below the boiling point of the water in the mix sufficient to cause hydrolysis.

The dispersion of the titanium compounds which are not readily soluble in water is aided by using as a carrier medium for the titanium compound, a mutually soluble solvent, for example, primary or secondary alcohols (ROH) where R is $C_1$ to $C_4$, for example, isopropyl alcohol or butanol. The chelates which are soluble in water may be used as a water solution.

Instead of using the organo titanium compound in solution in a solvent mutually soluble with water such as alcohols as above, we may use any of the organic solvents recommended as solvents for the organo-titanium compound, for example, n-heptane, $C_6H_6$, or the chlorinated hydrocarbons or other solvents referred to in said patent. In such case where the titania is formed by mixing with the alumina hydrate and water prior to forming of the pellet, the mixture may be aided by use of known emulsifiers for those solvents and intimate mixing or either. Such emulsifiers are well known to those skilled in that art.

The mixture of hydrated aluminum, water and titania compound is dewatered by drying with or without prior filtration to the degree suitable for extrusion and formed into desired shape by conventional techniques.

The pellet, after forming in any of the above procedures, may then be calcined and the titanium compound, if present as the organo titanium compound, is oxidized, or if present as hydrated $TiO_2$, is dehydrated to substantially anhydrous $TiO_2$. Should the hydrolyzed organo-metallic titanium contain $(OR)_3$ radicals for example, the titanoxy or titanium-hydroalkoxy compounds as $Ti(OR)_3OH$, or $(RO)_3TiOTi(OR)_3$, the calcination oxidizes these products and $TiO_2$ is formed in the calcined alumina titania complex such as anatase.

The chemistry of the hydrolysis and conversion of the organo-titanium compound into hydrated titania, $TiO_2 \times H_2O$ or intermediate hydrolyzed compounds containing alkyl radicals (OR) is described in the brochure "Tyzor Organic Titanates" referred to in said patent and in the literature referred to in said brochure. These are incorporated herein by this reference.

Where the organo-titanium compound is introduced in a nonmiscible solution such as where dispersed in the hydrocarbon or chlorinated hydrocarbon solvent and hydrolysis does not occur or occurs only in a limited degree, drying of the pellet and the oxidation or calcination will distill the solvent and convert the organo-titanium compound to $TiO_2$.

The mixture of alumina and the titanium compounds are dewatered and dried to the proper consistency for forming into pellets such as pills, cylindrical or non-cylindrical extrusions, and spheres. Such techniques for forming pellets are well known in this art.

The procedures of this application result in a pellet comprising an intimate mixture of alumina and titanium oxide in the form of anatase or mixed with amorphous titania. The pellet has an abrasion index of less than about 10% by the abrasion test described in said patent and a desirable crush index as is described below.

Such titanium-containing pellets form useful substrates for the production of catalysts by introducing active catalytic metals or metallic compounds which have a specific activity, such as, for example, hydrodesulfurizing catalyst described in the above-mentioned applications and patent, for example, the oxides and sulfides of Mo, Ni, or Co or mixtures thereof.

For such purpose we prefer to use an amount of titanium in the catalytic pellet to be in the range of about 1 to about 25%, for example, in the range of about 1 to about 15%.

The alumina hydrate may be the boehmite or pseudoboehmite type. We prefer to use the gelatinous hydrated alumina known as pseudoboehmite. Its composition and methods for production of the pseudoboehmite are described in U.S. Pat. No. 4,018,714 to which reference may be made. The resultant mixture of hydrolyzed titanium compound, alumina and water is dewatered to reduce the composition to an extrusion mix containing about 50–70% of $H_2O$ as described above.

The alumina pellet formed from the hydrated alumina and hydrated titania mixture is heated to drive off the water and the organic solvent if used prior to calcination of the pellet. The calcination step may include, as part of the calcination procedure, a lower temperature drying step. To form hydrodesulfurizing catalysts, the calcined pellet is impregnated with Mo and Ni and/or Co salt, in accordance with the procedures and in the concentration described in said patent. The impregnated product is calcined. The pellet has a superior abrasion resistance and crush strength by test procedures described below.

To produce a catalyst of superior abrasion resistance, the calcined substrate of our invention is impregnated with an aqueous solution of a compound of Group VI B and Group VIII metallic element to incorporate the Group VIII and Group VI B element into the substrate in an atomic weight ratio in the range of about 1 of the Group VIII metal to about 0.3 to about 10 of the Group VI B metal. The preferred range is about 1:0.3 to less than 1:2.5, with a ratio of about 1 of Group VIII B metal to less than 1.75 of the Group VI B metal preferred. The total of the Group VI B and Group VIII metals may be about 5% to about 30% by weight of the catalyst on a volatile free basis. Preferably, the total of the Group VI B and Group VIII metals is less than about 20% by weight of the catalyst on a volatile free basis.

The preferred Group VI and Group VIII metal elements in our catalyst are molybdenum and tungsten, nickel and/or cobalt, with nickel and molybdenum preferred.

The titanium is used in a weight ratio of about 1% to about 40% or preferably, to about 25% expressed as metal of the weight of alumina substrate on a volatile free basis. Preferably, less than about 8% of the titanium expressed as metal, are employed. Typical examples of suitable concentrations of metal in the calcined substrate, prior to loss by abrasion, as is illustrated by the following examples, is, for example, about 5% to about 40% for example, about 5% to 25% of Mo; and about 1% to about 25% Ti, or a total of all of these metal elements in the range of about 5% to about 40% of the weight calculated as metal plus substrate. As produced by our procedure, the catalyst of our invention has an abrasion index less than about 10% and may be less than 2%, for example, 0.5% to about 1.5% and a hardness index of less than about 10.

EXAMPLE 1

15,000 grams of the pseudoboehmite (2,220 grams volatile free weight) were intimately mixed with 540 grams of titanium hydrate pulp, (45% $TiO_2$). The mixture was dried to an extrusion consistency (about 60% moisture), extruded and dried at 210° F. for 16 hours and calcined at 1,000° F. for 3 hours. The pellets were subjected to abrasion according to the above procedure.

X-ray examination shows that the titanium is in the form of anatase.

Pellets produced by the procedure according to Example 2 have abrasion indices ranging from about 0.1 to about 5.

EXAMPLE 2

The 1,100 grams of calcined pellets produced according to Example 1 were placed in a container having a concave surface with its vertical axis mounted at an acute angle on a vertical rotating shaft. The pellets are tumbled and have their surfaces exposed to the solutions which are sprayed on the pellets as they are tumbled in an amount to be substantially entirely absorbed into the pellets. The pellets were impregnated first by molybdate solution. The solution was prepared by dissolving 157 grams of $MoO_3$ in 286 milliliters (ml) of distilled water which was mixed with 143 ml of 28% $NH_4OH$. The solution was diluted to 680 ml. The solution was sprayed onto the tumbled pellets in the rotating vessel and was substantially entirely absorbed into the pellets. The pellets were dried at 600° F. for 3 hours.

635 grams of the cooled dried pellets produced as above were placed in the rotating vessel and sprayed with a $Ni(NO_3)_2$ solution.

The nickel nitrate solution in distilled water contained 0.0764 grams NiO/ml. 330 ml of the solution was sprayed on the pellets. The pellets were dried at 250° F. for 16 hours and calcined at 1,000° F. for 3 hours and cooled.

The pellets were subjected to the above abrasion test and showed an abrasion index of 0.2% through 32 mesh screen.

The titanium-impregnated alumina substrate carrying also the Mo and Ni prepared according to our process, is an excellent hydrodesulfurizing catalyst.

EXAMPLE 3

Pseudoboehmite slurry was mixed with titania hydrate, dried and extruded into pellets as described above in Example 2. The extruded pellets were dried at 300° F. and calcined at 1,350° F. for 2 hours.

2,530 grams of the pellets were impregnated by the procedure described above with 1,900 ml of ammonium molybdate solution obtained by dissolving 361 grams of $MoO_3$ in an ammonia solution containing 328 ml of 28% $NH_4OH$. The pellets were dried and impregnated by the procedure described above with 1,630 ml of a nickel nitrate solution of concentration expressed as NiO of 114.5 grams NiO. The pellets were dried overnight and calcined at 1,000° F. for 3 hours.

The pellets analyzed, expressed as metal 7.76% Mo, 2.84% Ni, 5.21% Ti. The Abrasion Index of the pellets was 5.0%.

EXAMPLE 4

The catalysts prepared as above in Examples 2 and 3, were subjected to a standard hydrodesulfurization process employing Kuwait Vacuum Gas having the following properties: API gravity 22.5; nitrogen 714 ppm; sulfur 2.86% API Distillation 10% at 762° F., 50% at 862° F., End Point at 1031° F. The oil was passed through 100 ml catalyst with hydrogen at 400 psig at a hydrogen gas rate of 1500 standard cubic feet per barrel of gas oil (SCF/bbl), and at liquid hourly space velocity (LHSV) of 1, i.e., volume of feed passed per volume of catalyst in the reactor, at 715° F. The abrasion index was measured by the procedure described in said patent.

Instead of adding the titania hydrate to the alumina, we may generate the hydrate in situ by neutralizing a mixture of a salt of titanium, for example, titanium tetrachloride in a mixture with pseudoboehmite pulp.

EXAMPLE 5

A water slurry of 10,000 grams of pseudoboehmite (14.8% $Al_2O_3$) i.e. 1,480 grams $Al_2O_3$ were placed in an agitated vessel. 1,080 ml of titanium chloride solution containing 162 grams $TiO_2$ and a 14% $NH_4OH$ solution were added simultaneously to the alumina slurry, the quantity of $NH_4OH$ being adjusted to maintain the system alkaline. The pH was held from about 9.0 to 9.5 by adding a total of 1600 ml of 1:1 ammonium and water. The ratio of the weight of $TiO_2$ to the weight of $TiO_2$ plus the weight of $Al_2O_3$ was 0.1. The intimate mixture was then dried for the extrusion into pellets. The extrudates were dried at 250° F. for 16 hours. The pellets were calcined at 1000° F. for 2 hours.

EXAMPLE 6

Another portion of the dried extrudate pellets of Example 5 was calcined at 1350° F. for 2 hours.

EXAMPLE 7

An 867 gm portion of the pellets of Example 5 were impregnated with 380 ml ammonium molybdate solution of concentration expressed as $MoO_3$ of 104 grams $MoO_3$ and 94 ml 28% $NH_4OH$, dried at 250° F. for 16 hours and calcined at 600° F. for 2 hours.

327 ml nickel nitrate solution of concentration expressed as NiO of 32.9 grams NiO was then impregnated on the calcined pellets of Example 8, dried overnight at 250° F. and calcined at 1000° F. for 2 hours.

EXAMPLE 8

A portion of the pellets of Example 6 were impregnated with molybdenum and nickel by the same procedure as in Example 7.

The pellets were each analyzed for the content of the metallic compound in the pellets expressed as the metal; the porosity, surface area, and hardness were determined and are stated in Table 1 at pages 12 and 13.

EXAMPLE 9

15,000 grams of water containing pseudoboehmite filter cake produced by filtration of pseudoboehmite was slurried with 970 ml of tetraisopropyl titanate $Ti(OC_3H_7)_4$ (spg. 0.955) containing an amount equivalent to 28% by weight of $TiO_2$ and the slurry agitated. The slurry was dried sufficiently to permit its extrusion into cylindrical pellets. The pellets were dried and calcined in the other at 1350° F. for 2 hours.

The composition and properties of the pellets were as follows:
Hardness Index:4
Density $lb/ft^3$:29
Diameters inch:0.032
$TiO_2$ wt. %:8.83
Surface area $M^2/g$ (S.A.):192
Pore Volume (PV) ml/g:0.74

EXAMPLE 10

The pellets formed as in Example 9 were used as substrate and impregnated with Ni and Mo according to the procedure of Example 2. The catalyst contained titanium, nickel and molybdenum compounds in the form of their oxide in amounts expressed as metal 7.9% by weight of Mo, 2.8% by weight of Ni and 4.7% by weight of Ti. One portion of the catalyst was subjected to a hydrodesulfurizing process under the conditions stated in Example 4. The sulfur content of the treated distillate was 0.27%.

EXAMPLE 11

A portion of the catalyst of Example 10 was subjected to a standard test for hydrodesulfurization of a reduced petroleum crude oil of the type known as "resid" containing 3.67% sulfur.

The catalyst of Example 10 was sulfided by passing a vaporized sulfur containing petroleum distillate at a temperature of 714° F. together with hydrogen at a pressure of 400 psig and at the rate of 1500 standard cubic feet per bbl of the oil and at 1 LHSV for 12 hours.

At the end of the sulfiding operation, the resid was introduced together with $H_2$ at 714° F. and the pressure was increased to 1000 psig and the hydrogen rate was increased to 5000 SCF/BBL at 1 LHSV for 40 hours. The resid sulfur was reduced to 1.36% sulfur.

TABLE I

| Example | Crush Index | SA* | PV* | % Mo | % Ti | % Ni |
|---|---|---|---|---|---|---|
| 5 | 8 | 224 | .55 | — | 5.03 | — |
| 7 | 8 | 203 | .45 | 8.42 | 4.38 | 2.78 |
| 6 | 8 | 192 | .55 | — | 5.03 | — |
| 8 | 8 | 159 | .35 | 7.78 | 4.26 | 2.75 |
| 9 | 4 | 192 | 0.74 | — | — | — |

TABLE I-continued

| Example | Crush Index | SA* | PV* | % Mo | % Ti | % Ni |
|---------|-------------|-----|-----|------|------|------|
| 10 | — | — | — | 7.9 | 4.7 | 2.8 |

SA*—Surface area square meters per gram
PV*—Pore volume ml per gram

The hardness values "Crush Index" are determined by conventional procedures such as are described in U.S. Pat. No. 3,598,759, and in "Mechanical Testing of Extruded, Tableted, and Ring-Formed Catalysts" by Earl R. Veaver, AichE. Symposium Series, No. 143, Vol. 70, pp. 6–8. In the procedure employed to obtain the hardness values reported in Table 1, the pellets were centered on an anvil support of 13 ml diameter. A pneumatically activated piston of 0.39" diameter is positioned above and centrally of the anvil. The pellet on its side was positioned on the anvil centered under the piston. The piston was advanced until it just contacted the top side of the pellet and increased pressure was applied until the pellet crumbled. The force in pounds applied, measured by the pressure in the cylinder, is recorded as the hardness (here referred to as the Hardness Index), as measured on a pressure gauge. The Hardness Index is determined as the average of 30–40 pellet determinations and the spread of the values is from about 1 to about 5% of the average.

Surface area was determined by the method described in the article by P. H. Emmett in "Advances in Catalysis", Vol. 1, 1948, pp. 64–89, Academic Press, N.Y. Pore volume and pore volume distribution were obtained from the desorption branch of the nitrogen absorption isotherm following the method described by E. P. Barrett, et al., J.A.C.S., Vol. 73, p. 373 et seq., (1951). All surface area data is stated herein as square meters per gram of sample ($M^2$/gm); all pore volumes stated herein are in cubic centimeters per gram (cc/gm) of sample.

The results described above show that the catalyst produced by employing the process of our invention produced a pellet of exceptional abrasion resistance and hardness. The hardness value of the substrate of our invention is of an order to produce a practical catalyst of superior hardness which will have improved performance in catalyst process, such as desulfurization of distillates and residual oils. The catalyst because of its resistance to abrasion, maintains its volume, thus permitting the maintenance of the LHSV. Since the reduction of S decreases with increasing LHSV, the reduction in volume of the catalyst in the reactor by loss of fines due to attrition, at a constant feed rate and temperature, reduced the effectiveness of the catalyst.

Thus, not only is the catalyst improved in that loss of fines of the catalyst is minimized and an economic gain is obtained and ecological hazards mitigated but also the catalyst of improved hardness results in an improvement in the catalytic process in which it may be used.

The catalyst of our invention is particularly useful in hydrodesulfurizing distillates and residual petroleum fractions.

The operating conditions employed in the process of our invention employing the catalysts of our invention are at a temperature in the range from about 500° to about 1000° F., preferably in the range from about 600° to about 800° F.; space velocity from about 0.1 to about 10.0 volumes of liquid charge stock per volume of catalyst per hour. A preferred range is from about 0.5 to about 5.0. The hydrogen feed rate ranges from about 500 to about 10,000 standard cubic feet per barrel of feed stock, preferably in the range from about 1,000 to about 8,000 SCF/bbl. The pressure employed ranges from about 500 to about 5,000 p.s.i.g. When the feed stock is a distillate, we prefer to employ a pressure of about 500 to 3,000 p.s.i.g. For residual-containing stock, such as, for example, a reduced crude (atmospheric tower bottoms) or a residual stock boiling above about 950° F. (a vacuum tower bottoms), the preferred pressures are in the range from about 250 to about 2,500 p.s.i.g.

We claim:

1. A process for forming shaped alumina pellets which comprises mixing alumina hydrate with water and a hydrolyzeable titanium compound, hydrolyzing the titanium compound under substantially non-acid conditions to form hydrated titanium oxide, forming said mixture into a pellet, drying and calcining said pellet.

2. The process of claim 1 in which said titanium compound is titanium tetrachloride and said titanium tetrachloride is hydrolyzed by mixing the same with a base.

3. The process of claim 1 in which the hydrolyzeable compound is an organo-titanium compound chosed from the group consisting of the alkyl titanates Ti(OR)$_4$ where the alkyl radical R is $C_3$ or $C_4$ or $C_6$ or $C_8$ and the titanium chelates.

4. The process of claim 3 in which the organo-titanium compound is tetra isopropyl titanate.

5. The process of claim 1 in which the calcined aluminum pellet contains from about 1 to about 40% of titania based on the weight of the alumina expressed as $Al_2O_3$ and titania expressed as $TiO_2$, adding to said pellet a water solution of salt of a member chosen from the group consisting of the salts of Group VIII and Group VI-B metals, and mixtures thereof, the total weight of said salts being from about 5 to about 30% of the weight of the pellet on a volatile free basis, expressed as the metal with the atomic weight ratio of Group VIII metal to Group VI-B metal being from about 1:0.3 to about 1:10, all based on the weight of metal element plus the substrate, drying and calcining said pellet.

6. The process of claim 5 in which the titanium compound is titanium tetrachloride and the titanium tetrachloride is hydrolyzed by mixing the same with a base.

7. The process of claim 4 in which the organo-titanium compound is isopropyl titanate.

8. The process of claim 5 and sulfiding said catalyst.

9. The process of claim 6 and sulfiding said catalyst.

10. The process of claim 7 and sulfiding said catalyst.

* * * * *